(12) United States Patent
Kettenacker et al.

(10) Patent No.: US 7,225,059 B2
(45) Date of Patent: May 29, 2007

(54) METHOD FOR OPERATING A MOTOR VEHICLE

(75) Inventors: Guenter Kettenacker, Steinheim (DE); Juergen Saile, Leonberg (DE); Ulrich Schopf, Bietigheim-Bissingen (DE); Hauke Wendt, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 340 days.

(21) Appl. No.: 10/877,226

(22) Filed: Jun. 25, 2004

(65) Prior Publication Data

US 2005/0010335 A1 Jan. 13, 2005

(30) Foreign Application Priority Data

Jun. 26, 2003 (DE) ................. 103 28 786

(51) Int. Cl.
*B60K 1/00* (2006.01)
*B60L 7/10* (2006.01)
*G06F 19/00* (2006.01)

(52) U.S. Cl. ............... 701/1; 701/22; 701/70; 701/84; 701/90; 303/125; 318/434

(58) Field of Classification Search ............ 701/1, 701/70, 22, 78, 83, 84, 101, 102, 103, 93, 701/95, 90; 303/125; 180/197, 65.1, 65.3; 318/376, 434, 270
See application file for complete search history.

(56) References Cited

U.S. PATENT DOCUMENTS

| | | | |
|---|---|---|---|
| 5,161,432 A | 11/1992 | Matsumoto et al. | |
| 5,476,310 A * | 12/1995 | Ohtsu et al. | 303/3 |
| 5,603,672 A | 2/1997 | Zhang | |
| 5,638,677 A * | 6/1997 | Hosono et al. | 60/431 |
| 5,707,115 A * | 1/1998 | Bodie et al. | 303/3 |
| 5,775,784 A * | 7/1998 | Koga et al. | 303/152 |
| 5,984,034 A * | 11/1999 | Morisawa et al. | 180/65.2 |
| 6,144,928 A * | 11/2000 | Leimbach et al. | 702/173 |
| 6,178,371 B1 * | 1/2001 | Light et al. | 701/93 |
| 6,186,253 B1 * | 2/2001 | Barnhart et al. | 180/65.2 |
| 6,321,144 B1 * | 11/2001 | Crombez | 701/22 |
| 6,378,636 B1 * | 4/2002 | Worrel | 180/65.2 |
| 2001/0016795 A1 | 8/2001 | Bellinger | |
| 2005/0255966 A1 * | 11/2005 | Tao et al. | 477/27 |
| 2006/0081405 A1 * | 4/2006 | Kuang et al. | 180/65.2 |

FOREIGN PATENT DOCUMENTS

DE 10216546 10/2002

* cited by examiner

*Primary Examiner*—Tan Q. Nguyen
(74) *Attorney, Agent, or Firm*—Kenyon & Kenyon LLP

(57) ABSTRACT

In a method for operating a vehicle having a drive, a value of an internal torque to be supplied by the drive is determined from a positive propulsion torque requested by a user or a control and/or regulating system and the drive is triggered accordingly. Furthermore, the drive may supply a negative propulsion torque. A value of a negative propulsion torque requested by the user or by the control and/or regulating system is determined and then used to determine a value of a corresponding negative internal torque to be supplied by the drive and the drive may be triggered accordingly.

18 Claims, 4 Drawing Sheets

METHOD FOR OPERATING A MOTOR VEHICLE

FIELD OF THE INVENTION

The present invention relates to a method for operating a motor vehicle having a drive in which a value of an internal torque to be supplied by the drive is determined from a positive propulsion torque (forward propulsion torque) requested by a user or by a control and/or regulating system, the drive being triggered accordingly, and in which the drive is able to supply a negative propulsion torque (braking torque).

The present invention also relates to a computer program, an electric memory medium for a control and/or regulating device of a motor vehicle, a control and/or regulating device for a motor vehicle, and a motor vehicle.

BACKGROUND INFORMATION

In prior methods from the market for commercial vehicles, e.g., trucks driven by an internal combustion engine, the user of the vehicle may express a certain desire for power by operating an accelerator pedal. At a certain rotational speed, this power request corresponds to a certain propulsion torque at the output of a transmission of the internal combustion engine, which drives the commercial vehicle. On the basis of the transmission ratio, a clutch torque which must be available at the input of the transmission is calculated from the desired transmission output torque. Taking into account the internal friction of the internal combustion engine and the power tapped off by auxiliary units such as the fuel pump, the air conditioning system and so forth, the indicated torque or internal torque which must be generated by the combustion of fuel to supply the propulsion torque desired by the user is finally determined. This internal torque is essentially proportional to the amount of fuel injected, depending on the type of internal combustion engine and the operating state.

To protect the operating brake (e.g., disk brakes) acting on the driving wheels, there is usually an additional "engine brake" on commercial vehicles. With this engine brake, a negative propulsion torque may be generated by the engine, e.g., for prolonged downhill traveling.

Such an engine brake is usually operated by the driver via a two-step switch which turns the engine brake either on or off. However, automatic operation by a cruise control system which maintains a constant driving speed of the commercial vehicle without any intervention on the part of the driver is also possible.

SUMMARY OF THE INVENTION

An object of the present invention is to improve upon the prior method so that the burden on the driver of the vehicle is reduced and driving safety is increased.

This object is achieved by determining a value of a negative propulsion torque (braking torque) requested by the user or by the control and/or regulating system and by determining from this a value of a corresponding negative internal torque to be supplied by the drive, so that the drive may be triggered accordingly.

One advantage of the method according to the present invention is that the use of the "engine brake" is based on torque. Thus in the method according to the present invention, it is determined which propulsion torque is desired by the driver of the vehicle and/or the control and/or regulating system; the corresponding positive or negative internal torque is determined from this and the drive is triggered accordingly, e.g., by injecting fuel for generating a positive propulsion torque or by operating an engine brake for generating a negative propulsion torque.

This facilitates the incorporation of the engine brake into existing software structures and allows their use, taking into account numerous functions which influence the propulsion torque, i.e., the internal torque. Therefore, the engine brake may be used in a very specific manner in the method according to the present invention, and automated use is considerably simplified. For example, the engine brake may also be triggered via an internal CAN system (controller area network) of the vehicle. This reduces the burden on the driver of the motor vehicle. Furthermore, the engine brake may also be used in a targeted manner by a dynamic stability function or it may also be turned off briefly or its effect at least reduced, which thus increases driving safety.

It is very easy to incorporate the determination of the negative internal torque into existing program structures because a pre-existing computation pathway for determination of a positive internal torque to be supplied by the drive and a corresponding triggering of the fuel injection, for example, may remain unchanged.

It is first proposed that a value be determined for a maximum negative internal torque and that the value of the negative internal torque thus determined be set in ratio to the value of the maximum negative internal torque. This facilitates processing in terms of the software. However, this refinement is used in most cases only when the user defines a partial requirement of 50%, for example. Otherwise mostly absolute torques are used, which, however, are limited by a maximum value. This prevents "dead zones."

In a refinement, the value of the maximum negative internal torque depends on the prevailing operating conditions of the drive and/or the vehicle. This takes into account the fact that the maximum power of the engine brake may depend, for example, on the operating temperature, the duration of use and other influencing factors. It is thus possible to use the engine brake with a very high precision, which improves driving safety in particular.

According to the present invention, the value determined for the negative internal torque is transmitted to a processing unit, which uses this value to generate a value of a triggering signal for an actuator. Determination of the value of the negative internal torque is thus separated from the processing of this value. For example, this allows the use of the same software for determining the value of the internal negative torque in different vehicles, but one vehicle-specific processing unit. This reduces the cost of using the method according to the present invention.

It is preferred in particular if the value of the maximum negative internal torque is determined in the processing unit. A certain processing unit may thus be used for a certain type of engine brake without having to change the software for the determination of the value of the negative internal torque to be supplied.

It is advantageous in particular if the processing unit is supplied with information about which device has requested a negative propulsion torque. In this way, it is possible, when using the engine brake, to differentiate whether the requirement is based on a driver's request (the engine brake may then be used with a lower priority) or whether an intervention of dynamic stability control requires the use of the engine brake (use of the engine brake then has a high priority).

It is also expedient if the value of the negative internal torque thus determined is transmitted only (i.e., exclusively) to the processing unit. This prevents, for example, an antijerk function from being impaired by the negative internal torque thus determined.

Concrete embodiments of engine brakes, which operate reliably from a technical standpoint and are comparatively simple in function include providing the negative internal torque for an internal combustion engine with the help of a decompression valve brake, a throttle valve brake and/or a hydraulic retarder.

The advantages according to the present invention are particularly evident when the negative internal torque is supplied as an infinitely variable torque. In this way, exactly the negative propulsion torque requested may be generated for each driving situation and for each request from the driver. In particular, however, in cooperation with a cruise control system, the driving speed of the vehicle may be kept very constant without any intervention on the part of the driver, which is a benefit for driving comfort.

It is also important for driving comfort that the transition from a negative internal torque to a positive internal torque and also vice-versa, if necessary, takes place gradually. However, the load on the drive train (internal combustion engine—clutch—transmission—wheels) is also reduced in this way and thus its service life is prolonged. This function may also depend on which device requires the negative propulsion torque and which requires the positive propulsion torque.

It is fundamentally conceivable for a negative and a positive propulsion torque to be requested at the same time. For example, this is possible when the user operates a manual engine brake switch while also depressing the accelerator or if the engine brake switch or the gas accelerator pedal is defective. Three possible procedures are proposed for this case and may also optionally be selected by the user, e.g., before starting a trip. A first possibility is for a requested positive propulsion torque not to be taken into account if a negative and a positive propulsion torque are requested at the same time. An alternative possibility is for the requested positive propulsion torque to be taken into account if a positive propulsion torque has also been requested immediately before that and for the negative requested propulsion torque to be taken into account if a negative propulsion torque has also been requested immediately before that. Finally, it is also possible for a requested negative propulsion torque to fundamentally not be taken into account when a positive propulsion torque is requested at the same time.

The method according to the present invention is advantageous in particular when it is used in conjunction with an automatic cruise control. Procedures must then be established for how to proceed with respect to the negative propulsion torque when the cruise control is activated.

For example, when a negative propulsion torque is requested via a manual operating device (usually an engine brake switch), the value of the requested propulsion torque is formed by the minimum of the values determined for the propulsion torque from the position of an accelerator pedal and the control signal of a cruise control. If the accelerator pedal has not been operated, the cruise control may thus be overridden by manually operating the engine brake switch.

When a negative propulsion torque is not requested by a manual operating device and the accelerator pedal has been operated, it is also possible that the value of the requested propulsion torque is formed from the maximum of the values determined for the propulsion torque from the position of the accelerator pedal and the control signal of the cruise control. When the manual operating device is not operated, the procedure should follow the principle known from previous conventional cruise control systems. The driver may then request additional torque for passing, for example, by operating the accelerator pedal despite the fact that the cruise control is set, without having to turn off the cruise control to do so.

When a negative propulsion torque is not requested by a manual operating device and the accelerator pedal has not been operated, the value of the requested propulsion torque may correspond to the value determined for the propulsion torque from the control signal of a cruise control system. In this embodiment of the method according to the present invention, when neither the manual operating device nor the accelerator pedal is operated, the speed is set exclusively by the cruise control, with the entire possible positive and negative value range being possible for the propulsion torque. Optimum driving comfort is thus made possible in conjunction with a continuous adjustability of the braking torque in particular.

DETAILED DESCRIPTION

Figure 1:
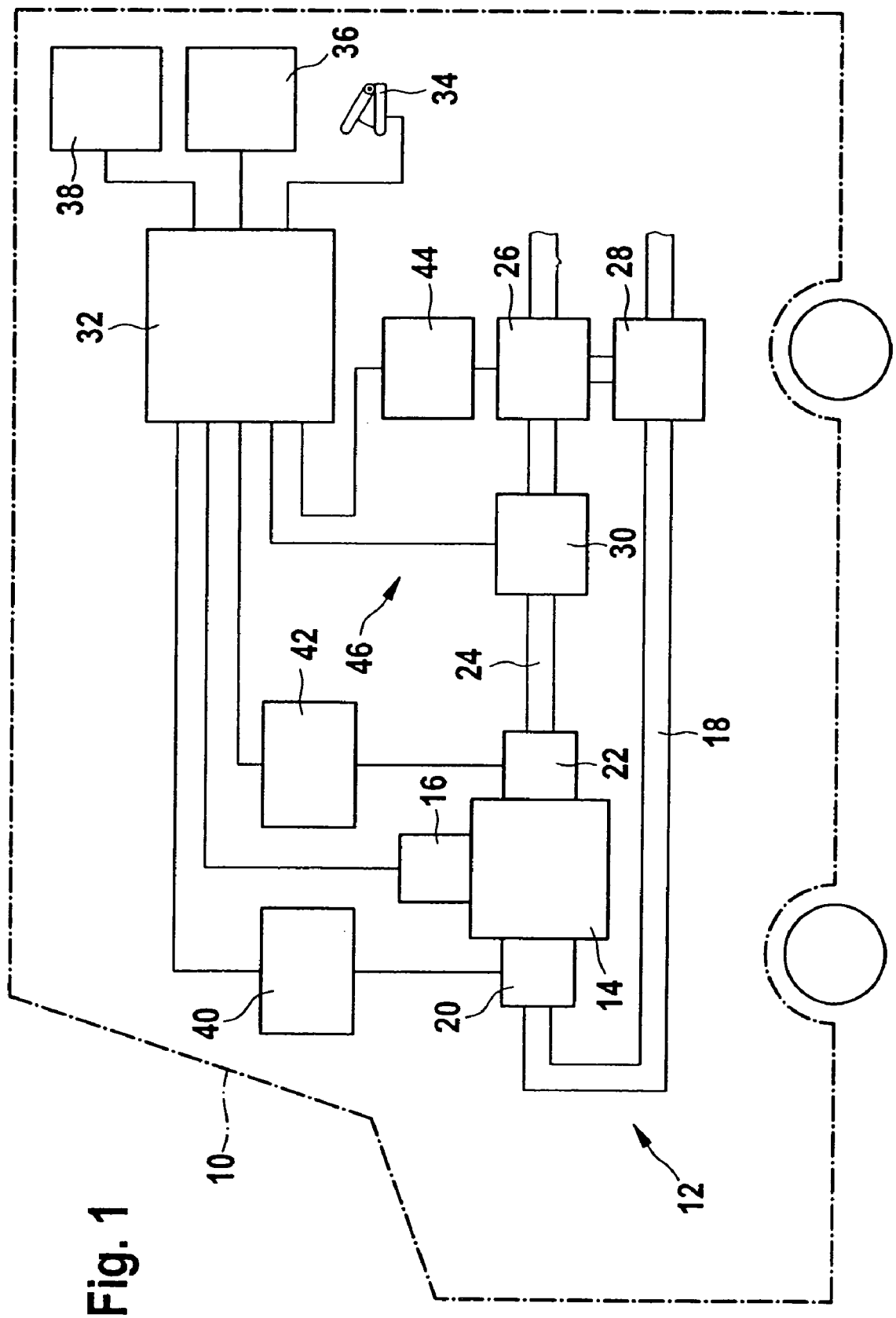
FIG. 1 shows a schematic diagram of a motor vehicle having an internal combustion engine and a device for supplying a negative propulsion torque (engine brake device).

FIG. 1 shows a motor vehicle 10 indicated schematically with dash-dot lines. This is a commercial vehicle, specifically a truck. Vehicle 10 is driven by an internal combustion engine 12, i.e., a diesel or gasoline engine. However, it should be pointed out explicitly here that most of the methods described below are essentially also applicable in the case of electric drives.

Engine 12, which is shown only schematically, has multiple cylinders, only one of which is shown in FIG. 1 and includes a combustion chamber 14, which receives fuel via a fuel injector system 16. Fresh air required for combustion of the injected fuel enters combustion chamber 14 through an inlet port 18 and an intake valve 20. Hot exhaust gas from combustion is discharged from combustion chamber 14 through an exhaust valve 22 and an exhaust port 24.

Combustion engine 12 has a turbocharger, which includes a turbine 26 which is situated in exhaust port 24 and drives a compressor 28 situated in intake port 18. Furthermore, a throttle valve 30 is also provided in exhaust port 24.

The operation of internal combustion engine 12 and motor vehicle 10 is controlled and/or regulated by a control and regulating device 32 which receives signals from an accelerator pedal 34, from a manual operating device 36 for an engine brake (engine brake switch) and from a control and regulating system designed as a cruise control 38. Control and regulating device 32 controls, among other things, actuators 40 and 42 using which the operating angle (opening and closing angles) of intake valve 20 and exhaust valve 22 may be influenced. Throttle valve 30 and fuel injector device 16 are also triggered by it.

Turbine 26 has a variable turbine geometry which may be adjusted via an actuator 44 which is also triggered by control and regulating device 32. Together with actuator 42 this yields a "decompression valve brake" whose braking effect is infinitely adjustable by adjusting the boost pressure. It should be pointed out here that no adjustment of the valve control angle or of intake valve 20 is necessary for the decompression valve brake. However, it is conceivable for intake valve 20 to remain closed during an intake cycle and to be opened briefly only at bottom dead center. The vacuum thereby created would then provide an additional braking effect.

Throttle valve 30 and actuator 44 including turbine 26 having variable turbine geometry and actuator 42 belong to an engine brake 46 which supports and/or reduces the load on the normal operating brake (not shown) of motor vehicle 10, which acts via brake disks on the wheels of vehicle 10, for example. In trucks in particular, overheating of this normal operating brake might occur, for example, when traveling downhill for a great distance unless a braking torque additionally acts on the driving wheels via the engine brake. An engine brake in the form of a hydraulic retarder is also possible.

To facilitate an understanding of the triggering of engine brake 46, various terms which play a role in this context will now be explained with reference to FIG. 2.

Combustion of the fuel injected by fuel injector devices 16 into combustion chambers 14 creates an "internal torque" trq_in (block 47). This internal torque, which is usually approximately proportional to the quantity of fuel injected, is counteracted by a resistance torque generated by the internal friction of the moving parts of engine 12. The parts generating such internal friction are combined as 48 in FIG. 2. This yields an "engine output torque" trq_eng (block 49).

However, various auxiliary units of vehicle 10 are also driven by engine 12. This includes, for example, fuel pumps, vacuum pumps, fans, air conditioning systems, hydraulic pumps, etc. These auxiliary units, combined as 50 in FIG. 2, also "consume" a portion of internal torque trq_in, resulting in what is known as "clutch torque" trq_clu (block 51). In vehicle 10, driving wheels 45 are driven via a manual or automatic transmission 52. Depending on the transmission ratio selected, a "transmission output torque" trq_gear (block 53) is obtained at the output of transmission 52. For the sake of simplicity, this is also referred to subsequently as "propulsion torque."

Figure 2:
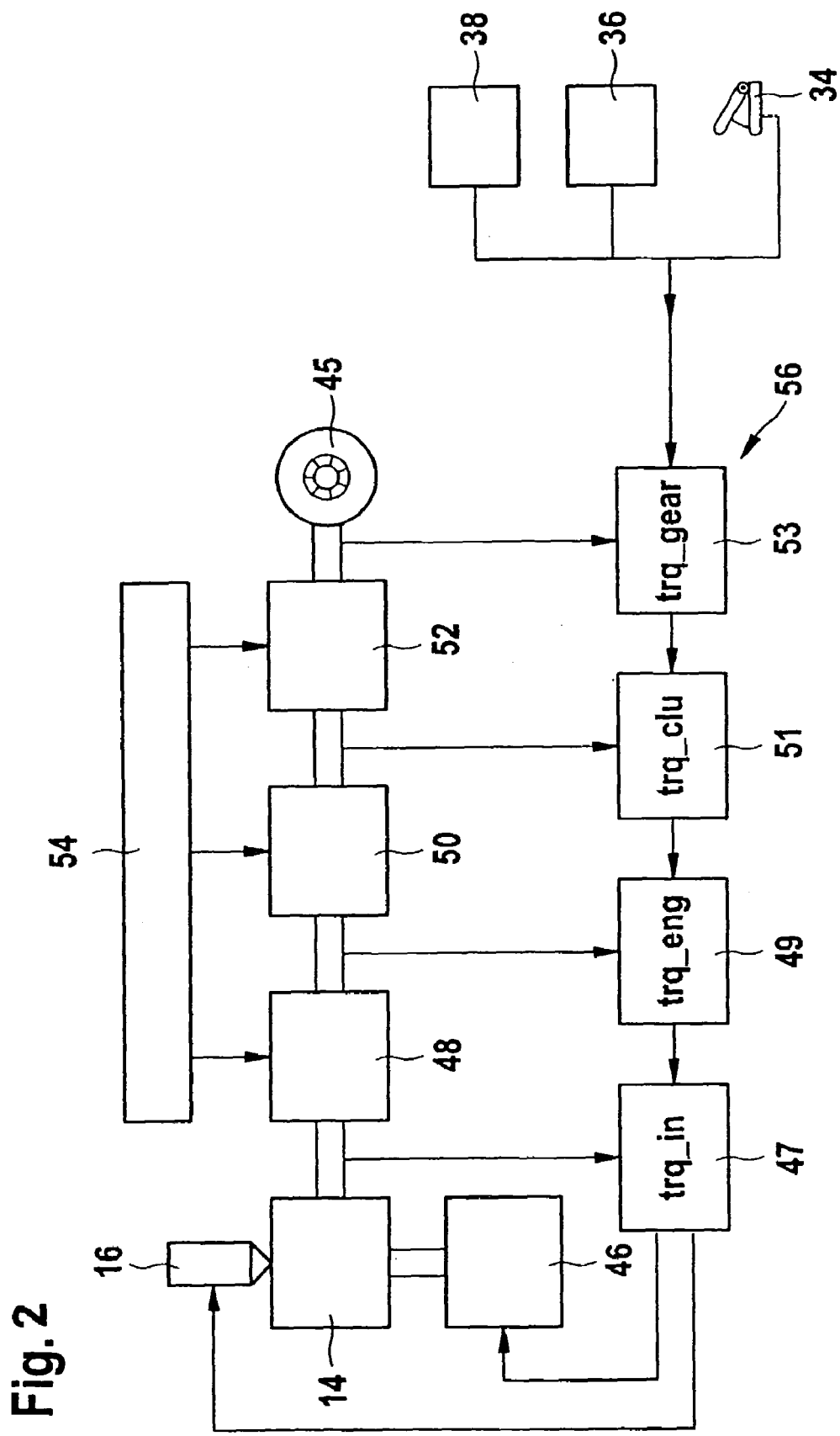
FIG. 2 shows a schematic diagram to illustrate the computation pathway by which a value of a requested internal torque of the internal combustion engine from FIG. 1 is determined from a requested propulsion torque.

The influence of friction 48, auxiliary units 50, and transmission 52 on the relationship between internal torque trq_in and propulsion torque trq_gear is not constant but instead depends on the operating conditions, which are combined as 54 in FIG. 2. These operating conditions include, for example, an operating temperature of engine 12. Maximum propulsion torque trq_gear that may be made available by engine 12 is lower when engine 12 is cold than when the engine is hot because more energy must be expended to overcome internal friction 48 when engine 12 is cold than when engine 12 is hot. Auxiliary units 50 are not driven continuously by engine 12 and the transmission ratio of gear 52 varies with the gear selected.

A positive internal torque +trq_in may be generated by injection of fuel via fuel injector devices 16 and combustion in combustion chambers 14. A negative internal torque −trq_in may be generated by a corresponding triggering of engine brake 46 (thus acting as a braking torque). A value of requested internal torque trq_in is determined on the basis of signals supplied by accelerator pedal 34, engine brake switch 36 and, if it is on, cruise control 38. A value of requested propulsion torque trq_gear is first determined from these signals (block 53).

Taking into account the current transmission ratio of transmission 52, a value of clutch torque trq_clu is determined from this (block 51); taking into account auxiliary units 50 currently to be driven, a value is determined (block 49) for engine output torque trq_eng; finally, taking into account internal friction 48, a value is determined (block 47) for internal torque trq_in which is necessary to be able to provide the desired propulsion torque trq_gear. The pathway described here for determining requested internal torque trq_in from requested propulsion torque trq_gear is also known as "torque path." It is labeled as 56 on the whole in FIG. 2.

Figure 3:
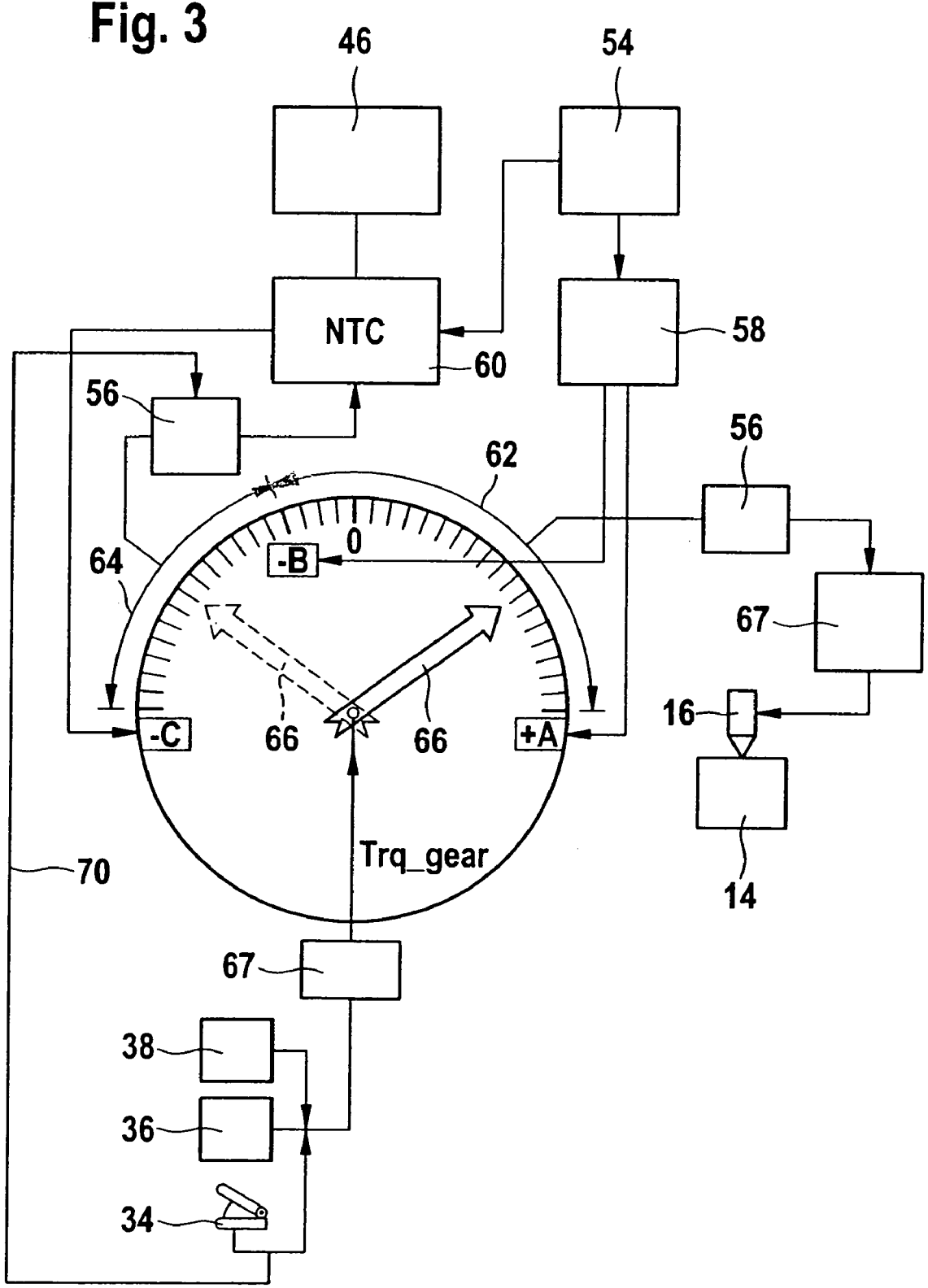
FIG. 3 shows a schematic diagram with a vector diagram illustrating the processing of a negative and a positive requested propulsion torque.

Use of requested internal torque trq_in in conjunction with engine brake 46 present in vehicle 10 will now be explained in greater detail on the basis of the diagram in FIG. 3.

The value range currently possible for propulsion torque trq_gear is determined first. For reasons explained above, this depends on current operating conditions 54 of engine 12 and vehicle 10. The value of maximum positive propulsion torque trq_gear to be made available by engine 12 at the moment is generated in a block 58 and is labeled as +A in FIG. 3. The value of maximum negative propulsion torque trq_gear that may be made available currently by engine 12 also depends on operating conditions 54. However, it is determined by a processing unit NTC (negative torque controller), labeled as 60 in FIG. 3, and is shown as −C in FIG. 3. A value −B for propulsion torque trq_gear, which also depends on operating conditions 54, occurs when no fuel is injected into combustion chambers 14 by fuel injector devices 16 (this corresponds to an internal torque trq_in of zero). It is self-evident that value −B will be greater when the engine is cold than when the engine is hot. Value −B is also calculated in block 58.

Thus not only the value range from −B to +A is available to vehicle 10 for requested propulsion torque trq_gear, as under the state of the art, but also in addition a negative value range from −B to −C, corresponding to a braking torque of engine brake 46, is available. The former value range is labeled as 62 in FIG. 3 and the latter is 64.

Figure 4:
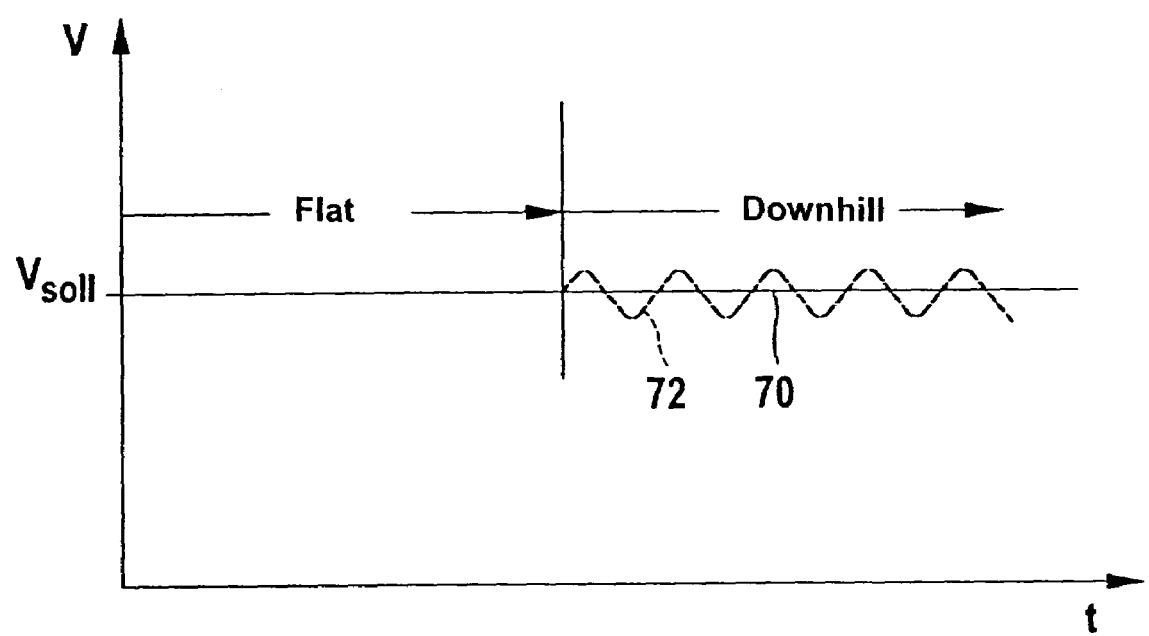
FIG. 4 shows a diagram in which a driving speed of the vehicle from FIG. 1 has been plotted as a function of time in two different driving situations.

Let us now assume the case when cruise control 38 is activated so that vehicle 10 is to travel at a certain constant speed Vsetpoint (see FIG. 4). First it is also assumed that engine brake switch 36 is not operated, so no negative propulsion torque in range −B to −C is requested explicitly. Finally, it is also assumed that the driver of vehicle 10 is not operating accelerator pedal 34. The corresponding signals are analyzed in a block 65.

If vehicle 10 is traveling on a flat road or uphill, a positive propulsion torque must be supplied by engine 12 to overcome rolling resistance and air resistance. A value of positive propulsion torque trq_gear thus requested is represented in FIG. 3 by the position of an arrow 66, shown with solid lines. Requested propulsion torque trq_gear varies in value exactly so that driving speed Vsetpoint is maintained. If requested propulsion torque trq_gear is in value range 62, a value of corresponding internal torque trq_in is determined via torque path 56 and a corresponding triggering signal for vehicle injection devices 16 is generated in a corresponding processing unit 67 in a manner not shown in greater detail in FIG. 3.

However, if vehicle 10 is traveling downhill, then a lower propulsion torque trq_gear must be supplied accordingly to maintain a constant setpoint speed Vsetpoint. It may happen that vehicle 10 would nevertheless accelerate even if no fuel is injected by fuel injector system 16 into combustion chambers 14. To protect the operating brakes in such a case, engine brake 46 is activated automatically. This activation is implemented when the value of requested propulsion torque trq_gear is in value range 64 (arrow 66 shown with a dashed line in FIG. 3). In this case, corresponding negative internal torque trq_in is also determined via torque path 56 and is relayed to processing unit 60, which then triggers engine brake 46 so that requested braking torque is generated—to the degree possible.

Now to turn to the case in which engine brake switch 36 is activated, i.e., a negative propulsion torque trq_gear is explicitly requested, cruise control 38 is activated and the driver has at least intermittently operated accelerator pedal 34. The corresponding signals are again analyzed in block 65. In this case, the value of requested propulsion torque trq_gear is formed from the minimum of the values determined for requested propulsion torque trq_gear from the position of accelerator pedal 34 and the control signal of cruise control 38. This means that when the accelerator pedal is not operated, engine brake 46 is activated, or in other words, when accelerator pedal 34 is not operated, cruise control 38 may be overridden by manual operation of engine brake switch 36 and vehicle 10 may be braked. In this connection, it should be pointed out that engine brake switch 36 is designed as a three-step switch having the following three switch positions: off, 50% engine braking power, 100% engine braking power. Alternatively, a simple two-step switch having an additional preselector may also be provided.

Another possible combination is for engine brake switch 36 not to be operated but accelerator pedal 34 to be operated or to have priority over cruise control 38. In this case, the value of requested propulsion torque trq_gear is formed from the maximum of the values determined for propulsion torque trq_gear from the position of accelerator pedal 34 and the control signal of cruise control 38. However, even when a propulsion torque trq_gear having a value in value range 64 is requested, engine brake 46 is not activated by processing unit 60. The reason is that when accelerator pedal 34 is operated according to path 70, this influences the calculations in torque path 56 in such a way that a negative internal torque (braking torque) is set to zero.

It may be seen here that operation of engine brake switch 36 may change the priority between accelerator pedal 34 and cruise control 38 as well as the type of analysis of the corresponding signals. Basically, however, it is also conceivable for these relationships to be influenced by other functions.

As already explained above, engine brake 46 is implemented technically by a continuously adjustable decompression valve brake and a throttle valve brake. When the decompression valve brake is used, the air compressed in combustion chamber 14 during the compression stroke is discharged through a corresponding opening of the exhaust valve into exhaust port 24 at the end of the compression stroke. There is therefore no gas spring energy acting on the piston (not shown in FIG. 1) essentially after passing top dead center, which results in an increased engine brake power. Depending on the crankshaft angle (not shown) of engine 12 at which exhaust valve 22 has been opened and depending on the boost pressure adjusted by actuator 44 of turbine 26, the engine brake power may be adjusted continuously.

In addition, the engine brake power may also be varied continuously by an adjustment of throttle valve 30. Through the possibility of continuous adjustment of the engine brake power and thus the activation of engine brake 46 on the basis of torque path 56, the driving speed of the vehicle may be maintained constant very accurately when cruise control 38 is turned on. This is represented by solid line curve 70 in FIG. 4. However, if there is only one engine brake that may be turned on and off or that has two braking effect stages (e.g., 50% and 100%), this yields a two-point control of driving speed according to dashed line 72 in FIG. 4.

Due to the fact that the use of engine brake 46 is based on torque calculations that have in principle been customary previously, engine brake 46 may also be activated by other functions, including, for example, a vehicle dynamics control system, an ABS, a maximum speed governor and so forth. To be able to optimally adapt the activation of engine brake 46 to the particular request basis, therefore not only one value of requested internal torque trq_in is transmitted to processing unit 60 but also information regarding which device has requested negative propulsion torque trq_gear is also transmitted to processing unit 60.

Moreover, it should also be pointed out that the transition from a positive requested internal torque trq_in to a negative requested internal torque generally takes place even when the change in requested propulsion torque trq_gear is highly dynamic. Timing elements and/or filter elements are also provided for this purpose. It should also be pointed out that the methods and procedures described above are stored in the form of a computer program in a memory 74 of control and regulating device 32.

What is claimed is:

1. A method for operating a motor vehicle having a drive capable of supplying a negative propulsion torque, comprising:

determining a value of an internal torque that is to be supplied by the drive, the value being determined from a positive propulsion torque requested by a user and by a system for at least one of control and regulating, the drive being triggered accordingly;

determining a value of a negative propulsion torque requested by one of the user and by the system for at least one of control and regulating; and determining from the value of the negative propulsion torque a value of a corresponding negative internal torque to be made available by the drive, the drive being triggered accordingly.

2. The method as recited in claim 1, further comprising:

determining a value of a maximum negative propulsion torque;

setting the value of the negative propulsion torque in a ratio to the value of the maximum negative propulsion torque.

3. The method as recited in claim 2, wherein:

the value of the maximum negative propulsion torque depends on an instantaneous operating condition of at least one of the drive and the motor vehicle.

4. The method as recited in claim 2, wherein:

the value of the maximum negative propulsion torque is determined in a processing unit.

5. The method as recited in claim 1, further comprising:
transmitting the determined value of the negative internal torque to at least one processing unit that, as a function thereof, generates a value of a triggering signal for an actuator.

6. The method as recited in claim 5, further comprising:
sending to the at least one processing unit information regarding which device has requested a negative propulsion torque.

7. The method as recited in claim 1, wherein:
the determined value of the negative internal torque is sent only to a certain processing unit.

8. The method as recited in claim 1, wherein:
the negative internal torque of an internal combustion engine is made available by at least one of a decompression valve brake, a throttle valve brake, and a hydraulic retarder.

9. The method as recited in claim 1, wherein:
the negative internal torque supplied is infinitely adjustable.

10. The method as recited in claim 1, wherein:
a transition from the negative internal torque to the positive propulsion torque takes place gradually.

11. The method as recited in claim 1, wherein:
when a negative and a positive propulsion torque are requested at the same time, either a requested positive propulsion torque is not taken into account; or the positive requested propulsion torque is taken into account if immediately before that a positive propulsion torque had also been requested, and the negative requested propulsion torque is taken into account when immediately before a negative propulsion torque had also been requested; or a requested negative propulsion torque is not taken into account.

12. The method as recited in claim 1, wherein:
when a negative propulsion torque is requested by a manual operating device, the value of the requested propulsion torque is formed from the minimum of the values determined for the propulsion torque from a position of an accelerator pedal and a control signal of a cruise control.

13. The method as recited in claim 1, wherein:
when a negative propulsion torque is not requested by a manual operating device and an accelerator pedal is operated, the value of the requested propulsion torque is formed from the maximum of the values determined for the propulsion torque from a position of the accelerator pedal and a control signal of a cruise control.

14. The method as recited in claim 1, wherein:
when a negative propulsion torque is not requested by a manual operating device and an accelerator pedal is not operated, the value of the requested propulsion torque corresponds to the value determined for the propulsion torque from the control signal of a cruise control.

15. A computer program containing instructions that when executed results in a performance of the following:
determining a value of an internal torque that is to be supplied by the drive, the value being determined from a positive propulsion torque requested by a user and by a system for at least one of control and regulating, the drive being triggered accordingly;
determining a value of a negative propulsion torque requested by one of the user and by the system for at least one of control and regulating; and
determining from the value of the negative propulsion torque a value of a corresponding negative internal torque to be made available by the drive, the drive being triggered accordingly.

16. An electric memory medium for a control and/or regulating device of a motor vehicle, the electric memory medium storing a computer program containing instructions that when executed results in a performance of the following:
determining a value of an internal torque that is to be supplied by the drive, the value being determined from a positive propulsion torque requested by a user and by a system for at least one of control and regulating, the drive being triggered accordingly;
determining a value of a negative propulsion torque requested by one of the user and by the system for at least one of control and regulating; and
determining from the value of the negative propulsion torque a value of a corresponding negative internal torque to be made available by the drive, the drive being triggered accordingly.

17. A control and/or regulating device for a motor vehicle, the control and/or regulating device being programmed to perform the method of:
determining a value of an internal torque that is to be supplied by the drive, the value being determined from a positive propulsion torque requested by a user and by a system for at least one of control and regulating, the drive being triggered accordingly;
determining a value of a negative propulsion torque requested by one of the user and by the system for at least one of control and regulating; and
determining from the value of the negative propulsion torque a value of a corresponding negative internal torque to be made available by the drive, the drive being triggered accordingly.

18. A motor vehicle, comprising:
control and/or regulating device for a motor vehicle, the control and/or regulating device being programmed to perform the method of:
determining a value of an internal torque that is to be supplied by the drive, the value being determined from a positive propulsion torque requested by a user and by a system for at least one of control and regulating, the drive being triggered accordingly;
determining a value of a negative propulsion torque requested by one of the user and by the system for at least one of control and regulating; and
determining from the value of the negative propulsion torque a value of a corresponding negative internal torque to be made available by the drive, the drive being triggered accordingly.

* * * * *